Aug. 11, 1959         J. E. BROMLEY         2,898,751
FLEXIBLE COUPLING
Filed Dec. 16, 1957

INVENTOR.
JAMES E. BROMLEY
BY
ATTORNEYS

United States Patent Office 2,898,751
Patented Aug. 11, 1959

2,898,751

FLEXIBLE COUPLING

James E. Bromley, Pensacola, Fla., assignor to The Chemstrand Corporation, Decatur, Ala., a corporation of Delaware Application December 16, 1957, Serial No. 702,888

2 Claims. (Cl. 64—11)

This invention relates to coupling devices and more particularly to couplings of the flexible type for connecting rotating machine elements such as shafts, rods, spindles, and the like, wherein the torsional vibration is excessive and which can be appropriately employed in textile machinery such as drawtwisters and similar thread processing apparatus. It is particularly adaptable for reducing or eliminating excessive torsional vibration on the roll shaft of filament drawtwisters of which the drawtwister manufactured by the Whitin Machine Works of Whitinsville, Massachusetts, is an example.

As is well known, it is a common practice in the design of machinery having rotating or moving parts to utilize shafting of various types. For uniting such shafting, flexible couplings have been used for some time for the primary purpose of overcoming shaft misalignment. Flexible couplings in general are characterized by certain inherent shortcomings which limit their application such as inability to withstand shock loads and to transmit heavy torques. When these flexible couplings were utilized to drive exceptionally heavy loads, particularly those where high acceleration and deceleration rates were encountered, failure of the coupling occurred with increased frequency and thus gave a shortened useful coupling life. Another source of dissatisfaction was the need for disconnecting or disassembling of the shafting in some cases during installation or replacement of the coupling, which added considerably to the time and cost of operation, particularly where the machinery is heavy and complex in nature.

In certain shaft applications, particularly those applications in which the shaft is relatively elongate, it is not uncommon for the shafting to develop excessive torsional vibration. This torsional vibration may be attributed to many factors such as low modulus of elasticity, vibrations in associated parts of the apparatus at frequencies approaching the natural frequency of the shaft, excessive friction or drag in the shaft bearings and the like.

In textile machinery in particular, torsional vibration often occurs in the shafting of machinery such as drawtwisters, winding apparatus, and other types of thread handling or processing equipment. In a drawtwister, for example, of a type such as referred to above, it has been found in many cases that the torsional vibration in the feed roll shaft often becomes excessive creating a serious failure of the machine to perform in the desired manner when processing synthetic filaments or fibers such as those composed of nylon and the like. As a result of this feed roll vibration, the drawn and twisted filaments acquired highly undesirable physical properties such as the formation of streaks in subsequent dyeing operations, poor denier uniformity, and the like.

Accordingly, a primary object of this invention is to provide a new and novel flexible coupling.

Another object of this invention is to provide a coupling of the flexible type for the coupling of rotating shafts which reduces or substantially eliminates the torsional vibration in the shafts during rotation.

A further object of this invention is to provide a new and novel flexible coupling for connecting a pair of shafts which may be simply and easily installed without disconnecting or removing the shafts from the associated machinery.

This invention further contemplates the provision of a new and novel flexible coupling for shafting which is inherently capable of withstanding rapid acceleration and deceleration rates while transmitting heavy torques with substantially no likelihood of failure.

A still further object of this invention is to provide a new and novel flexible coupling for rotating machine elements such as shafts and the like which is simple and rugged in construction, is easily assembled and removed, and which is capable of prolonged use in heavy duty applications without danger of breakdown.

Other objects and advantages of the invention will become apparent from the following description taken in connection with the accompanying drawing.

In general, the objects of the invention are accomplished by providing a pair of rotating machine elements such as shafts which are to be coupled with their end portions in opposed relationship. A sleeve member composed of a resilient material is positioned so as to extend circumferentially around these shaft end portions. Means are provided for connecting each of the end portions of the shafts to the resilient sleeve member and in the preferred embodiment a keying arrangement forms this connecting means. The sleeve member is clamped in the assembled position by clamping means such as a pair of complementary half-shells which are secured in the assembled relationship by any suitable means such as bolts or the like. In order to prevent the clamping means from moving relative to the resilient sleeve member, keying means may also be positioned between the clamping member and the sleeve member.

The novel features which are believed to be characteristic of the invention are set forth with particularly in the appended claims. The invention itself, however, both as to its organization and method of operation may be best understood by reference to the following description taken in conjunction with the accompanying drawing in which:

Referring now to Figures 1 through 4, there is shown a flexible coupling constructed in accordance with the invention and designated generally by the numeral 10. The coupling 10 is employed to couple or unite a pair of rotating members such as shafts 11, 12 which may constitute components of any type of apparatus such as the ends of a drive roll and feed roll of a drawtwister of the type referred to above. As is well known, flexible couplings have been widely used in the coupling of shafts and the like in order to provide for misalignment in the coupled shafts and other purposes, but heretofore have been primarily limited to applications involving little, if any, shock loading and the transmission of relatively light torques.

Figure 4:
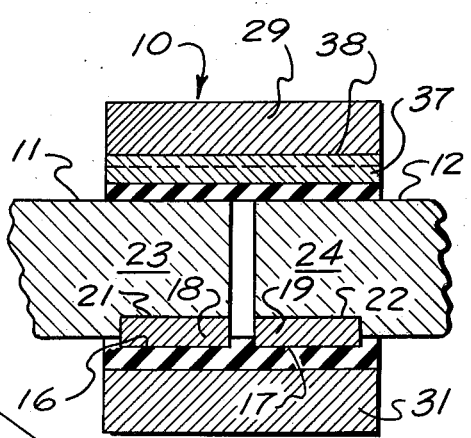
Figure 4 is a sectional view taken substantially along line 4—4 of Figure 2 in the direction of the arrows.

As shown best in Figure 4, the shafts 11, 12 are located in the usual manner with their adjacent ends in opposed relationship and in substantially coaxial alignment.

Figure 3:
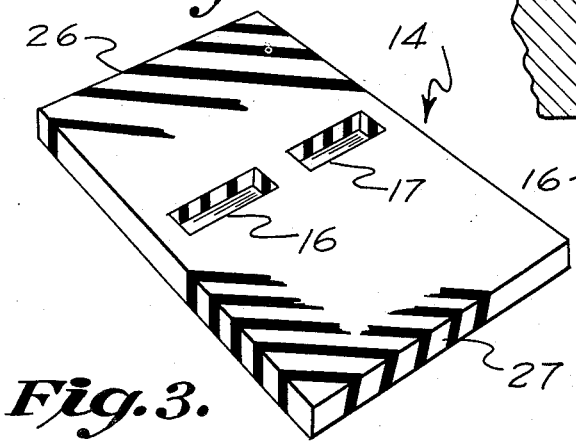
Figure 3 is a perspective view of the resilient sleeve member incorporated with the invention.

As specifically illustrative of the novel construction of the invention, a sleeve member designated generally by the numeral 14 is provided which may be substantially planar in form, as shown in Figure 3, and which is composed of a resilient material such as neoprene rubber or the like.

In the illustrated embodiment, the sleeve member 14 is cut away or otherwise formed to provide a pair of slots or recesses 16, 17 in its upper surfaces which are preferably arranged with their longitudinal axes in alignment as shown. The slots 16, 17 are of sufficient depth so as to extend throughout a substantial portion of the thickness of the sleeve member as shown in Figure 4. More specifically, the slots 16, 17 are appropriately dimensioned so as to accommodate in tight fitting engagement connecting means such as keys 18, 19 (Figure 4) which are preferably rectangular in cross section.

Means have been provided for connecting the sleeve member 14 to the shafts 11, 12 in order to transmit torque between the shafts 11, 12 by a shearing action within the sleeve member 14.

Figure 2:
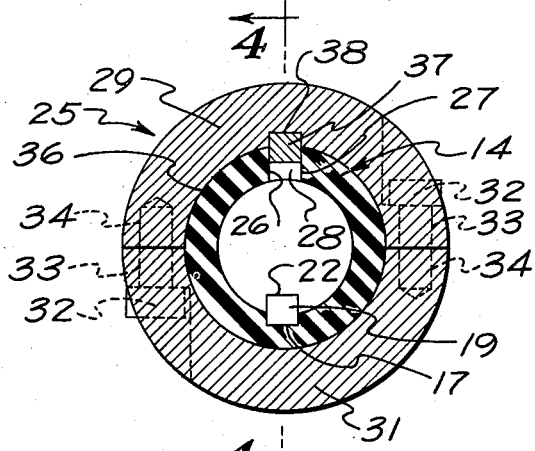
Figure 2 is a sectional view taken substantially along line 2—2 of Figure 1 in the direction of the arrows.

Therefore, in the assembly of the coupling 10, the sleeve member 14, with the keys 18, 19 positioned within their associated slots 16, 17, respectively, is positioned in encircling relationship along the end portions of the shafts 11, 12 as shown best in Figure 2 and the portion of the keys 18, 19 extending out of the slots 16, 17 are inserted within corresponding recesses or keyways 21, 22 positioned in each of the end portions 23, 24 of the shafts 11, 12, respectively.

It should be understood that the shafts 11, 12 are rotated to an angular position in which the longitudinally extending slots 21, 22 are positioned in substantial alignment. Thus the keys 18, 19 positioned within the slots 16, 17 are snugly received in the shaft keyways 21, 22 when the sleeve member 14 is positioned as shown in Figures 2, 4 circumferentially about the shaft end portions 23, 24. By means of the keys 18, 19, slipping between the shafts 11, 12 and the sleeve member 14 is prevented and torque may be smoothly and positively transmitted from one shaft to the other through the resilient sleeve member 14.

The length of the sleeve member 14 may be selected so that its end walls 26, 27 (Figure 3) meet in substantially abutting engagement, but in the specific embodiment illustrated, the length of the sleeve member is such that when the sleeve member is wrapped around the shaft end portions 23, 24, the end walls 26, 27 are positioned in spaced relationship and define a space or gap 28.

Figure 1:
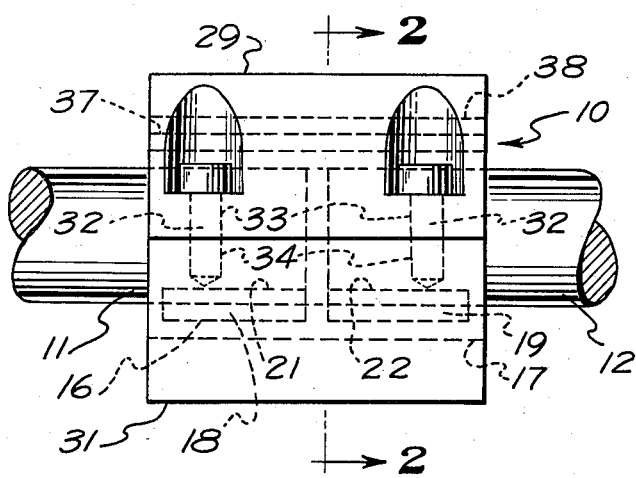
Figure 1 is a view of the invention shown in an installed position.

It should be understood that although the sleeve member 14 is shown in planar form in the embodiment of Figures 1, 4, the sleeve member may be constructed in a tubular form which would permit the sleeve member 14 to be easily slipped into the position of Figure 2 in concentric relationship with the shaft end portions 23, 24.

In order to securely position the sleeve member 14 on the shaft end portions 23, 24, clamping means designated generally by the numeral 25 are provided which encompass the sleeve member 14 and retain it securely in the wrapped position of Figure 1.

More specifically, the clamping means 25 comprises a pair of complementary half-shells 29, 31 as shown best in Figure 2, which are located in cooperating clamping engagement with sleeve member 14. The half-shells 29, 31 are securely held in this assembled relationship by any suitable means such as bolts 32, pairs of which are arranged along opposite sides of the clamps 29, 31 as shown in Figures 1, 2 and preferably in inverted relationship. In the preferred embodiment, the bolts 32 are passed through recesses 33 in one of the half-shells and engaged with suitably threaded recesses 34 in the other half-shell.

If desired, the inner walls of the coupling half-shells 29, 31 may be knurled or roughened in any suitable manner to aid in eliminating slipping between the half-shells and the resilient sleeve member 14. Furthermore, knurling or the like may also be provided on the peripheral surfaces of the shafts 11, 12, to aid in eliminating slipping between the shaft end portions 23, 24, and the sleeve member 14.

In the preferred embodiment, however, positive slip preventing means for the clamping means 25 are provided which comprises keying means such as an elongated key 37 received within an appropriately formed recess 38 in the upper half-shell 31. As shown best in Figure 2, the key 27, which is preferably rectangular in cross section, extends partially within the space 28 formed by the opposed ends 26, 27, of sleeve member 14. Thus positive locking action is obtained and relative movement between the sleeve member 14 and clamping means 25 is virtually eliminated.

When the coupling 10 is employed to join a pair of rotatable shafts 11, 12, one of which constitutes a driven shaft and one a driving shaft such as shown in Figure 1, the torque of the driving shaft such as shaft 11, is transmitted through its associated key 18 to the sleeve member 14, which torque is subsequently transmitted through the adjacent key 19 to the driven shaft 12. Thus, any torsional vibration between the shafts is absorbed in the resilient sleeve member 14, and the rugged construction of the coupling 10 enables it to transmit heavy torque even where high acceleration and deceleration rates are encountered.

It will be understood that one of the outstanding features of the invention is the provision of a flexible coupling which does not require dismounting or disassembling of the shafts to be coupled in order to assemble the coupling. Without disturbing the shafts in any way, the coupling of this invention may be assembled and disassembled in a rapid and simple manner. This arrangement is particularly useful in the coupling of the feed roll shaft to its driving shaft in a drawtwister of the type referred to above where the shafting is heavy and difficult to assemble.

Furthermore, it can be seen that another outstanding feature of the invention is the ability of the coupling to reduce torsional vibration which may develop in the driven shaft such as in an arrangement where shaft 11 is employed to drive shaft 12, and wherein the driven shaft 12 would normally develop excessive torsional vibration. Due to the novel construction of the coupling 10, virtually all of the vibration is absorbed within the flexible sleeve member 14 as transmission of the vibration to the driving shaft 11 is held to an absolute minimum by the sleeve member 14.

While there has been described what at present is considered to be the preferred embodiment of the invention, it will be understood by those skilled in the art that various changes and modifications may be made therein without departing from the invention and, therefore, it is the aim of the appended claims to cover all such changes and modifications as fall within the true spirit and scope of the invention.

Having thus described the invention, what is claimed is:

1. A flexible coupling comprising, in combination, a sheet of resilient material, said sheet material arranged to be positioned in encircling relationship with the end portions of an associated pair of shafts when said shaft end portions are in substantially coaxial endwise relationship to form a resilient sleeve member, said sleeve member having opposed ends positioned in substantially parallel spaced relationship to define a space, means for connecting each of said shaft end portions to said resilient sleeve member, means for clamping said sleeve member to said shaft end portions, keying means on said clamping means engageable within said sleeve member spaced ends to prevent relative movement between said clamping means and said resilient sleeve member.

2. A flexible coupling comprising, in combination, a sheet of resilient material, said sheet material arranged to be positioned in encircling relationship with the end portions of an associated pair of shafts when said shaft end portions are in substantially coaxial endwise relationship, to form a resilient sleeve member said sleeve member having opposed ends arranged in substantially parallel, spaced relationship to define a slot, means for keying each of said shaft end portions to said resilient sleeve member, a pair of complementary half-shells arranged to form a tubular clamp concentric with said resilient sleeve member, a key on one of said half-shells engageable with said slot for preventing relative movement between said half-shells and said resilient member, and means for securing said assembled half-shells in said sleeve member clamping engagement.

References Cited in the file of this patent

UNITED STATES PATENTS

| | | |
|---|---|---|
| 1,702,057 | Murray | Feb. 12, 1929 |
| 2,271,567 | Olson | Feb. 3, 1942 |
| 2,409,385 | Pletcher | Oct. 15, 1946 |
| 2,642,729 | Strausser | June 23, 1953 |